Figure 9:
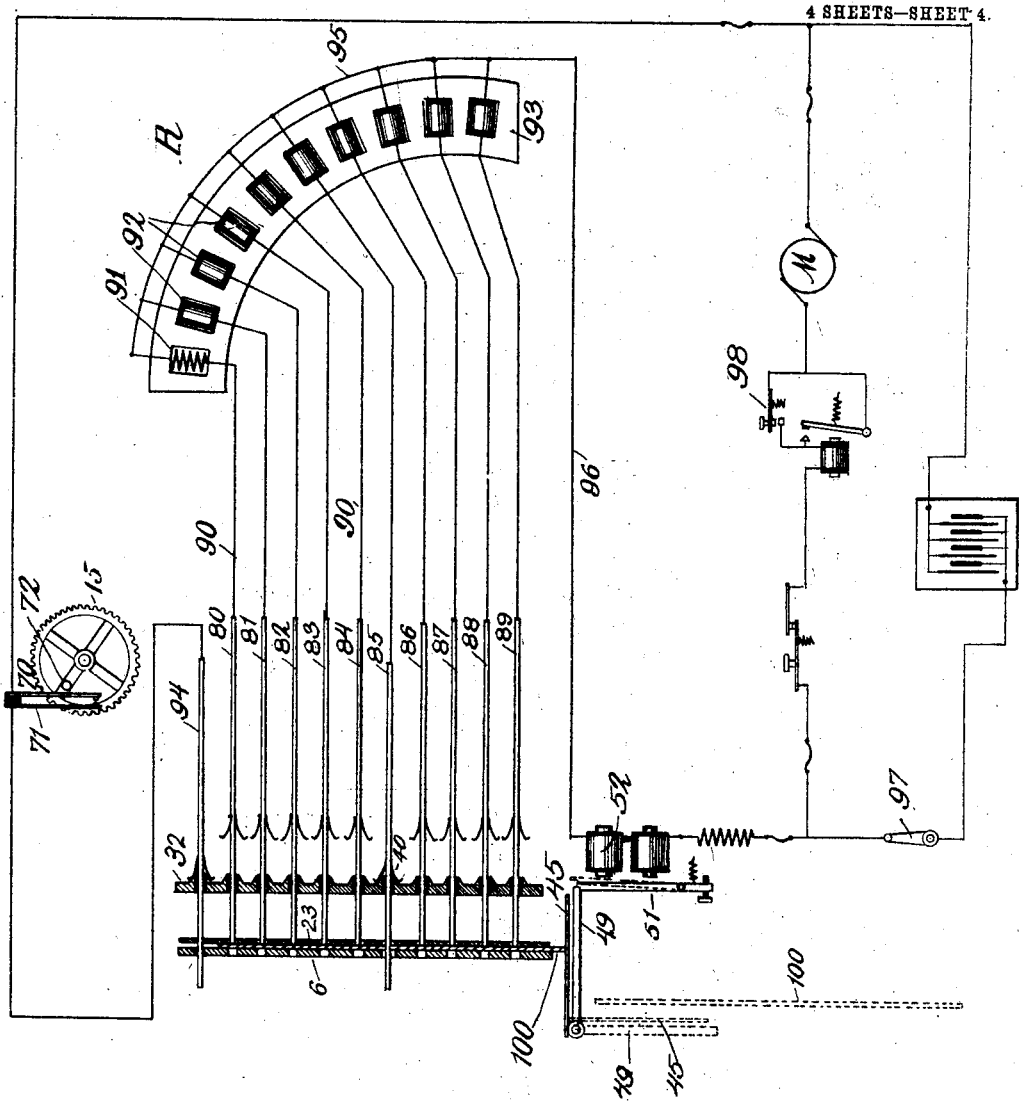

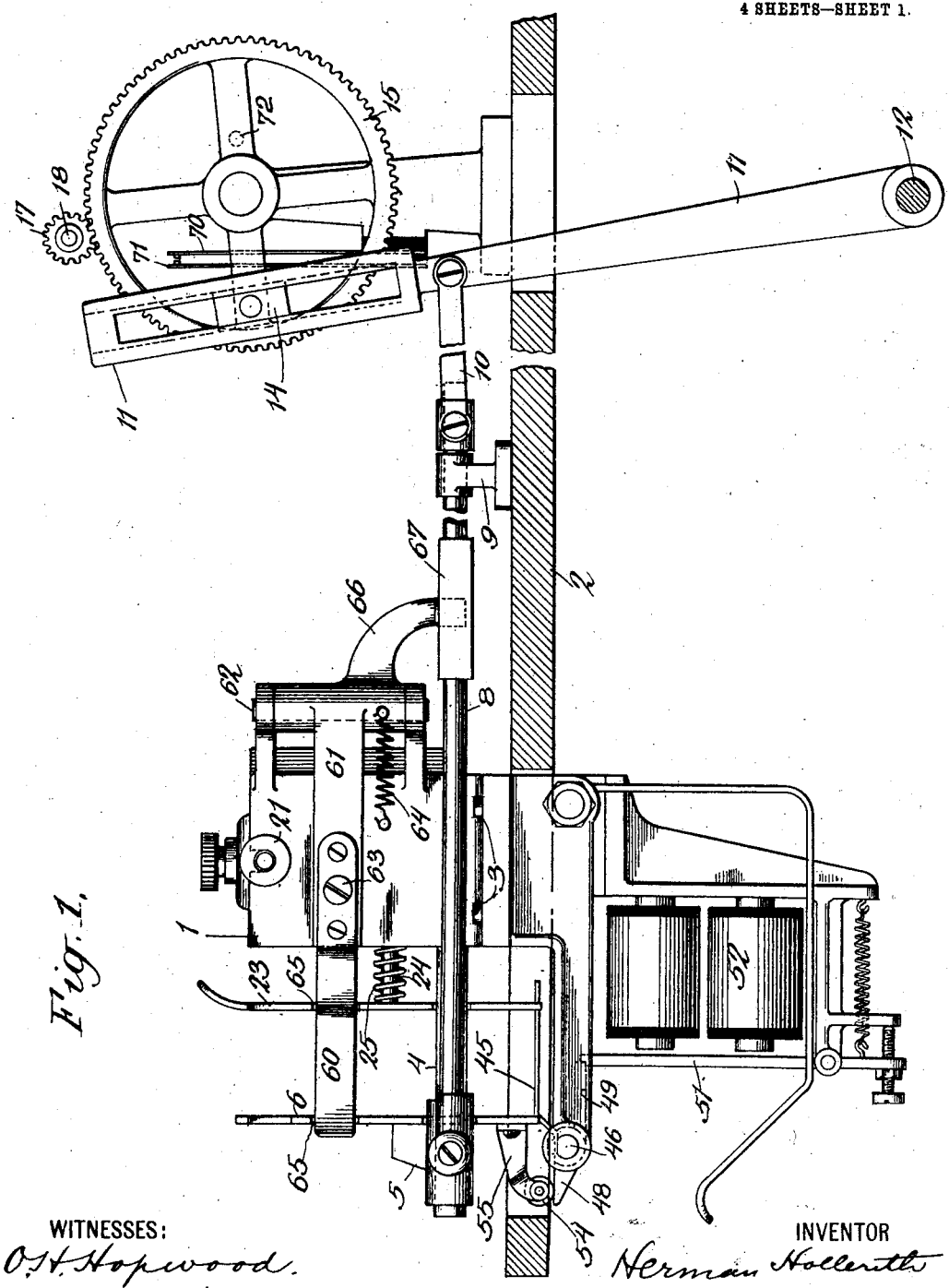

No. 814,700. PATENTED MAR. 13, 1906.
H. HOLLERITH.
APPARATUS FOR USE IN TABULATING AND OTHER LIKE SYSTEMS.
APPLICATION FILED JAN. 10, 1905.
4 SHEETS—SHEET 2.
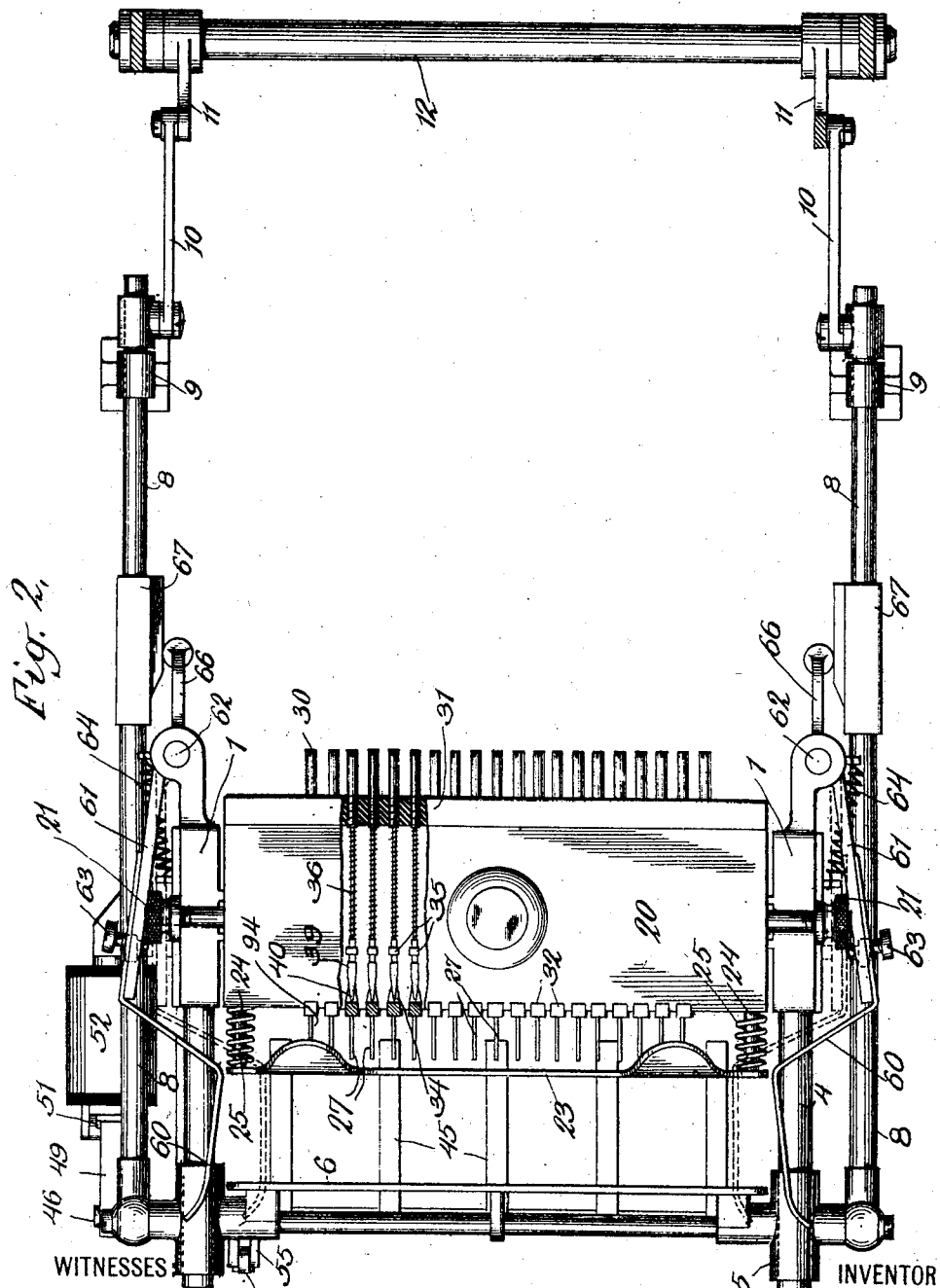

No. 814,700. PATENTED MAR. 13, 1906.
H. HOLLERITH.
APPARATUS FOR USE IN TABULATING AND OTHER LIKE SYSTEMS.
APPLICATION FILED JAN. 10, 1905.
4 SHEETS—SHEET 3.
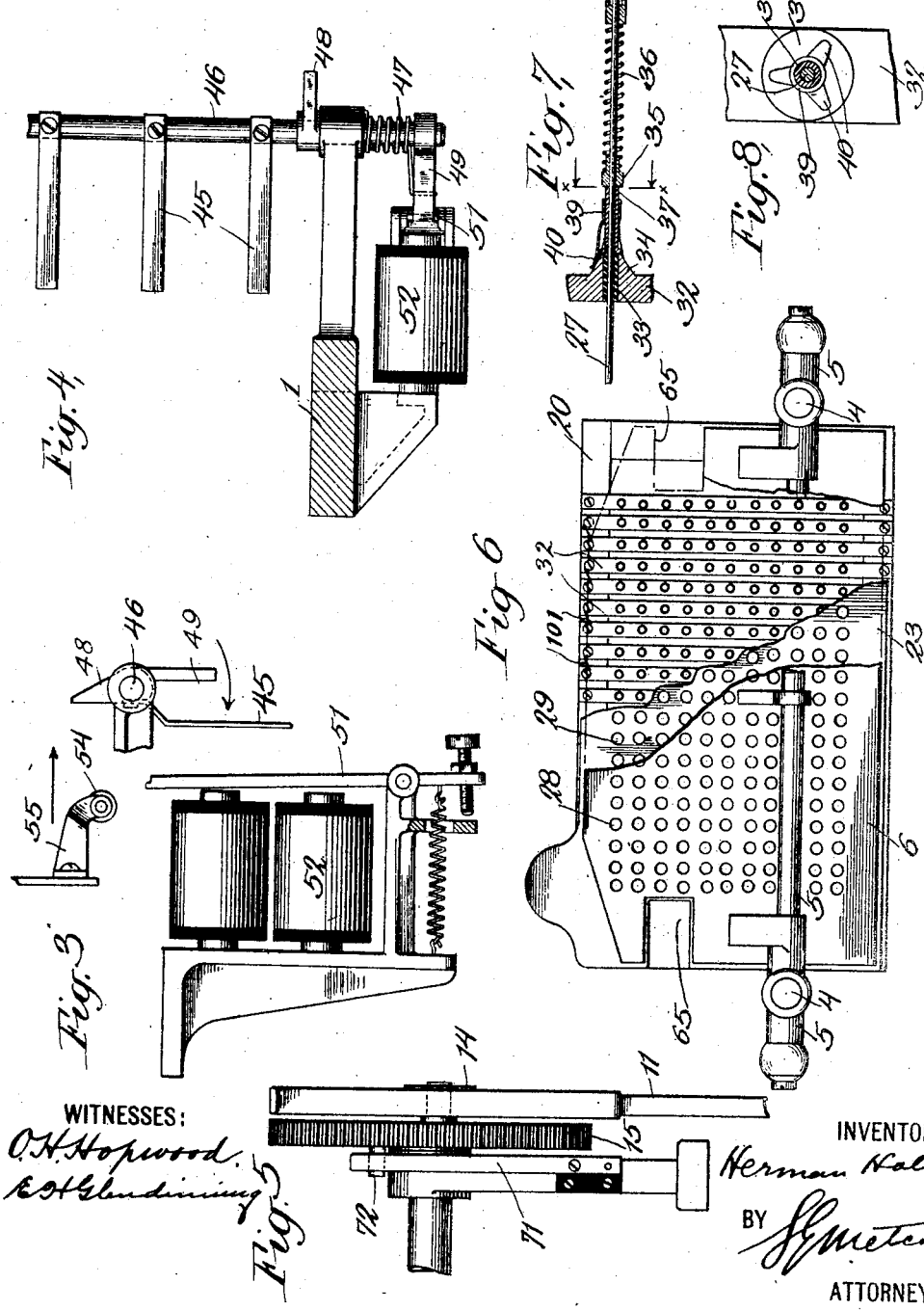
WITNESSES:
O. H. Hopwood
E. H. Glendining
INVENTOR
Herman Hollerith
BY J. J. Metcalf
ATTORNEY No. 814,700. PATENTED MAR. 13, 1906.
H. HOLLERITH.
APPARATUS FOR USE IN TABULATING AND OTHER LIKE SYSTEMS.
APPLICATION FILED JAN. 10, 1905.
4 SHEETS—SHEET 4.

WITNESSES:
O. H. Hopwood
E. H. Glendinning

INVENTOR
Herman Hollerith
BY
J. G. Metcalf
ATTORNEY

UNITED STATES PATENT OFFICE.

HERMAN HOLLERITH, OF GARRETT PARK, MARYLAND, ASSIGNOR, BY MESNE ASSIGNMENTS, TO THE TABULATING MACHINE COMPANY, A CORPORATION OF NEW JERSEY.

APPARATUS FOR USE IN TABULATING AND OTHER LIKE SYSTEMS.

No. 814,700.   Specification of Letters Patent.   Patented March 13, 1906.

Application filed January 10, 1905. Serial No. 240,428.

*To all whom it may concern:*

Be it known that I, HERMAN HOLLERITH, a citizen of the United States, residing in Garrett Park, Montgomery county, Maryland, have invented certain new and useful Improvements in Apparatus for Use in Tabulating and other Like Systems, of which the following is a full, clear, and exact description, reference being had to the accompanying drawings, forming part of this specification.

This invention relates, primarily, to means and apparatus for use in the Hollerith tabulating system; and the principal object of the invention is to provide means by which the records employed in that system may be expeditiously and accurately tabulated, classified, or verified. Certain features of my invention, as will be more specifically indicated in the claims, relate to such a system in which the cards or records control electric circuits by means of the index-points thereon, and as to such features my invention comprises a novel arrangement of electric circuits and novel means for controlling the same by means of the record index-points.

My invention also comprises novel means for presenting the records successively to the record-actuated circuit-controlling means or their equivalent.

I have selected for the purposes of illustration and description an apparatus which embodies my invention in a preferred form, and an arrangement of electric circuits adapted to be used with the tabulating-registers shown and described in my United States Letters Patent No. 677,214, dated June 25, 1901, to which reference is made for a further description of the construction and mode of operation of said registers; but it is to be understood that my invention is not limited to the particular form of apparatus herein shown or to its use for tabulating alone, since it may be employed in connection with other apparatus—such, for instance, as that described in my United States Letters Patent No. 685,608, dated October 29, 1901, and No. 777,209, dated December 13, 1904, as well as for the verification of the records either before or after tabulation.

In the drawings, Figure 1 is a side elevation, viewed from the right, of an apparatus embodying my invention. Fig. 2 is a plan thereof. Fig. 3 is a side elevation, viewed from the left, of the record-releasing devices. Fig. 4 is a plan view thereof. Fig. 5 is a front elevation of the circuit-controlling devices which are actuated at each operation of the apparatus. Fig. 6 is a front elevation, partly in section, of the pin-box and coöperating parts. Fig. 7 is an enlarged section of one of the record-actuated contact devices carried by the pin-box. Fig. 8 is an enlarged cross-section thereof on the line $x\ x$, Fig. 7; and Fig. 9 is a diagrammatic view showing the general arrangement of the circuits as the apparatus is used for tabulating in conjunction with the registers described in my said Letters Patent No. 677,214.

Similar reference characters are employed to designate like parts in all the views.

The particular form of apparatus illustrated in the drawings comprises two standards 1, which are secured to a horizontal table or support 2 by the screws 3. Studs 4 project from the standards 1 and form guides for the cross-head 5, which carries the platen or card-plate 6, which, with its coöperating parts to be described, constitutes a record-carrier. Connecting-rods 8, supported in suitable bearings 9, are connected at one end with the cross-head 5 and at the opposite end with the links 10, which are pivotally secured to the connecting-rods 8 and to the rock-arms 11, mounted on the shaft 12. The rock-arms 11 are slotted to receive the sliding block 14, pivotally secured to the gear 15, which meshes with the driving-pinion 17 on the shaft 18, driven by a motor M. When operated in connection with the apparatus illustrated in my said Patent No. 677,214, the gear 15 is arranged to revolve in synchronism with the gear 74 of said patent. As will now be understood, one revolution of the gear 15 will effect one reciprocation forward and back of the cross-head 5 and card-plate 6.

A pin-box consisting of a rectangular frame 20 is removably clamped in the standards 1 by the thumb-nuts 21. A pressure-plate 23 is carried in front of the pin-box 20 by studs 24, slidably mounted in the pin-box, and coil-springs 25, carried by the studs 24 between the face of the pin-box and the pressure-plate 23, yieldingly support the latter. The pin-box 20 carries a plurality of record actuated or controlled selecting devices comprising the spring-pressed conducting-pins 27, and the card-plate 6 and pressure-plate 23 are provided with registering perforations 28 and 29, one for each of said pins, so that when the card-plate is carried toward the pin-box by the reciprocation of the crosshead 5 it will engage the pressure-plate and carry it also toward the pin-box, the pins 27 entering and projecting through the perforations. On the return movement of the crosshead the springs 25 will return the pressure-plate 23 to its normal position, while the card-plate 6 will be carried to its forward limit of movement, leaving a card-feeding space between the pressure-plate and card-plate, as shown in Figs. 1 and 2. If, however, a card, or, as I prefer to term it, a "record" is placed between the card and pressure-plates when they are carried toward the pin-box, the portions of the cards which cover the perforations in the card-plate 6 engage the pins and force them backward, and only such pins as may register with perforations formed in the card will remain in their normal positions. (Shown in Figs. 2 and 7.)

The selecting devices or pins, which are generically indicated by the numeral 27, constitute the actuating element of what (since they are contacts which are directly actuated by the unpunched portion of the record-cards) I hereinafter refer to as "record-actuated contacts" and are arranged in separate groups in the pin-box and are slidably mounted at one end in conducting terminal sockets 30, which are held in the back plate 31 of insulating material, while near the opposite end they are supported in bars 32, each bar extending across the front of the pin-box. Each pin is insulated from its bar 32 by insulating-bushings 33. The bars 32 are made of conducting metal and are formed with cone-shaped projections 34 on their inner edges. On each pin, Fig. 7, is secured a collar 35, and between the same and the socket 30 is a coil-spring 36. A thimble 37, of conducting metal, is also secured to each pin and seats against its conical projection 34 on the bar 32. The contact-piece proper is carried by the thimble 37 and is preferably formed with a cylindrical section 39, fitted securely to the thimble, and with a number of resilient arms 40, which furnish a wiping contact with the projection 34. Hence when the pin is pushed back into the pin-box by engaging with an unpunched portion of a record-card the arms 40 will be carried away from the projection 34; but if the pin 27 passes through a punched hole in the card the arms 40 will remain in contact with the projections 34.

Record-supports in the form of fingers 45 normally extend across the space between the card-plate 6 and the pressure-plate for the purpose of supporting the record, so that the index-point positions thereon will register vertically with the perforations in said plates until it is clamped between them. The fingers 45 are rigidly secured to a rock-shaft 46 at the front of the machine. A spring 47 tends to rock the shaft 46 to carry the inner ends of the fingers downward, as shown in Fig. 3. A toe 48 and an arm 49 are secured to the rock-shaft 46. A spring-retracted armature 51 of an electromagnet 52 is arranged to engage the arm 49 on the rock-shaft 46 and hold the arms 45 in their normal or horizontal position. (Shown in Fig. 1.) When the record reaches its operative position and closes the circuit through the coils of the magnet 52, as will be presently described, the armature 51 is drawn out of engagement with the arm 49 and the spring 47 will cause the fingers 45 to drop into the position indicated in Fig. 3 and in dotted lines in Fig. 9. The record is thus left unsupported by the fingers 45; but it will be firmly clamped in position between the card-plate 6 and pressure-plate 23 until the backward movement of the former releases it, when the record will drop into a suitable receptacle below the platform 2. The continued backward movement of the card-plate 6 will cause the reset wheel 54, mounted in a bracket 55, secured to the card-plate, to engage the toe 48 and rock the shaft 46 to carry the arm 49 again into engagement with the armature 51, the circuit through the armature-coils having in the meantime been broken and the armature released.

For the purpose of insuring the correct horizontal registration of the index-point positions of the records with the perforations in the card and pressure plates and with the pins 27 I provide centering-arms 60 at the ends of the pressure-plate. Said arms are secured to levers 61, which are pivoted at 62 to the standards 1. Adjusting-screws 63 are carried by the levers 61, and their points are held against the standards 1 by the springs 64 when a record is in operative position. The arms 60 work in slots 65, formed in the card and pressure plates, and by adjusting the screws 63 exact registration of the records may be secured.

In order to permit the rapid feeding of the records to the apparatus, it is essential that the arms 60 should be separated when a record is fed to the apparatus. For this purpose I provide the levers 61 with arms 66, which are engaged by cams 67, fast on the connecting-rods 8. When the card-plate is in its forward position and a record is to be fed to the apparatus, the arms 66 will be engaged by the cams 67 and the forward ends of the arms 60 will be sufficiently separated to permit the convenient feeding of the records; but as the card-plate is carried toward the pressure-plate the cams 67 will be carried out of engagement with the arms 66 and the springs 64 will swing the arms 60 toward each other, so as to engage one end or the other of an incorrectly-positioned record and shift it horizontally until the ends of the adjusting-screws 63 contact with the standards 1. This will occur just before the record is clamped between the card and pressure plates, so that when this occurs the index-point positions of the record will be in exact registration with the perforations in said plates.

The main operating-circuit for the record-actuated contacts is normally open and is closed momentarily at each complete reciprocation of the apparatus by a pair of normally separated contacts consisting of two spring conducting-arms 70 and 71, arranged at one side of the gear 15. On the gear 15 is secured a stud 72, which at each revolution of the gear, and while the record is in its operative position, engages the arm 70 and carries the contact-point thereof against the contact-point of arm 71, holding them together momentarily until the continued revolution of the gear 15 carries the stud 72 out of engagement with the arm 70, breaking the circuit.

The register R, of which one section is indicated diagrammatically in Fig. 9, as will more fully appear by reference to my said Patent No. 677,214, is designed for the tabulation or compilation of items of value or amount, and a simplified form of record for such work is described and illustrated in said patent. The items thereon are divided into groups each of which may comprise one or more transversely-arranged parallel columns of numerals from 0 to 9, inclusive, arranged successively from the top of the record. These numerals designate the index-point positions on the record and correspond to the position of the selecting devices or pins 27 in the pin-box. Thus the group of pins specially indicated in the diagram Fig. 9 by the numbers 80-89 includes the pins which are controlled by one column of index-point positions on the record, the pin 80 representing the "0", the pin 81 the index-point position denoted by the figure "1," and so on successively. The pin 80 is, by conductor 90, electrically connected with a resistance-coil 91, and each of the pins 81 to 89 is similarly connected with one of a group of electromagnets 92, which are supported in a pair of sector-shaped plates 93. The resistance 91 and the magnets 92 correspond, respectively, with the resistance 94 and the magnets 78, (shown and described in my said Patent No. 677,214.) When the apparatus is in operation and the coils of one of the magnets 92 are energized, the magnet will actuate mechanism by which the item denoted by its corresponding index-point on the record is added to the amount appearing on the indicators of the register. Thus if the circuit be closed through the contacts of pin 80, which represents the cipher and is connected with resistance 91, no addition will be made; but if the circuit be closed through the contacts of pin 85, which represents the "5," five will be added to the amount shown on the indicators. The pin 94 is constructed and operates in substantially the same manner as the pins 80 to 89; but its purpose is, only to carry the current to the bar 32, and it is so arranged in the pin-box that when the record is properly positioned to actuate the other pins it will just clear the edge of the card and will pass freely through the perforations in the pressure and card plates and the contact between it and the bar 32 will be maintained, while if the card be improperly positioned it will engage the pin 94, breaking such contact and no current will flow to the bar 32.

With this brief but sufficient description of the operation of the registers and their actuating-magnets I will now describe the operation of the apparatus herein shown, referring first to the diagram Fig. 9. The main circuit for all the record-actuated contacts is normally open between the contacts 70 and 71, and the resistance-coil 91 and magnets 92 are arranged in multiple relation between the conducting-bar 32 and the common return 95. The apparatus is set in motion by closing the switch 97 and depressing the key 98, which closes the circuit through the motor M. A record 100, which has been punched at the index-point position denoted by the figure "5" in the column of figures corresponding to the particular group of selecting devices and register-operating magnets shown in the diagram, is inserted in the feed-space between the card and pressure plates, being supported there by the fingers 45 during the forward movement of the card-plate until it is properly centered by the arms 60 and clamped between the card and pressure plates. It is in this position carried further forward, escaping the ground-pin 94, and the unpunched portion of the card will engage all the pins 80 to 89, except the pin 85, and carry their contact-tongues back out of contact with the bar 32; but the pin 85 will pass through the punched hole, and the tongues 40 on this pin will remain in contact with the conical projection 34 on the bar. Then as the card reaches the inner limit of its movement the main circuit will be closed at the contacts 70 71 by the stud 72 on the gear 15, and the current will flow through pin 94 to bar 32 to pin 85, through the coils of the magnet connected therewith, through the conductors 95 and 96, energizing the fifth magnet from the top in the series of magnets 92 and actuating the registering mechanism to add five to the amount shown on the indicators and also energizing the magnet 52, releasing the arm 49, and permitting the fingers 45 to drop. On the backward or return movement of the card and pressure plates the record will be released as soon as the pressure-plate reaches its limit of motion, and the record thus released will drop by gravity into a suitable compartment or receptacle under the apparatus.

Only one ground-pin 94 is employed for all the registers or other equivalent record-controlled devices used in connection with my invention, and said pin 94, the conducting-bars 32, and all the groups of magnets 92 of the registers or equivalent devices are by the conductors 101 and the card-actuated contacts so connected in series that if at any operation of the apparatus the contacts carried by said pin 94 or by any of the magnet-controlling pins in any of the predetermined groups does not remain closed, owing, for instance, to improper centering or improper punching of the record, the circuit through the apparatus will remain open at the point, and the register-indicators and record-releasing devices will not operate. I have not considered it necessary to illustrate or describe more than one group of register-magnets, since the principle of operation of all is the same and the series connection above referred to is fully understood by those skilled in the art.

For the purpose of securing brevity and simplicity in the foregoing description I have purposely refrained from describing numerous modifications in form and operation which might obviously be made without involving any departure from my invention; but it is not my intention that the appended claims (except where clearly limited in terms) shall exclude such modifications or equivalents or such reversal of parts or action as would fall within the scope or embody the principles of my invention.

In my United States Letters Patent No. 685,608, hereinbefore referred to, I have illustrated and described a device for momentarily arresting the vertical movement of the record when it reaches its operative position. That device, however, is entirely different in construction and mode of operation from the record-supporting device herein described and claimed, since it does not support the record while the latter is being moved into its operative position, nor is it directly actuated to release the record by the record-actuated contacts. Nevertheless I have in some of the appended claims used expressions which indicate that the releasing device for the record-support is to be operated directly by the record-actuated contacts in order to distinguish the record-arresting device above referred to, which is actuated directly by the moving parts of the apparatus.

Having thus described my invention, what I claim as new, and desire to secure by Letters Patent, is—

1. In apparatus of the character described, record-actuated selecting devices, a swinging record-supporting device, means for holding said device under the records and means controlled by the records for releasing said holding means to permit the supporting device to swing out of the path of the record.

2. In apparatus of the character described, record-actuated selecting devices, a swinging record-supporting device, means for holding said device under the records, means controlled by the records for releasing said holding means to permit the supporting device to swing out of the path of the record, and resetting means for said supporting device.

3. In apparatus of the character described, record-actuated selecting devices, a reciprocating member for presenting the record to the action of the selecting devices, a pivoted record-supporting device, means for releasing said device and permitting it to swing out of the path of the record and resetting means for said support.

4. In apparatus of the character described a movable record-carrier, a movable record-support, means for releasing said support and resetting means therefor.

5. In apparatus of the character described, record-actuated selecting devices, a record-supporting device and means actuated directly by any of the selecting devices for releasing the record-supporting device.

6. In apparatus of the character described, record-actuated selecting devices, a record-supporting device, means actuated directly by the selecting devices for releasing the supporting device, and resetting means for said supporting device.

7. In apparatus of the character described the combination of record-actuated contacts, a record-supporting device, releasing means therefor controlled directly by said record-actuated contacts and means for returning said supporting device to initial position.

8. The combination of record-actuated selecting devices, record-carrying means, a motor for imparting relative movement to the selecting devices and carrying means, a record-supporting device, means actuated directly by the selecting devices for releasing said supporting device and means actuated by the motor for resetting said supporting device.

9. The combination of record-actuated selecting devices, a record-supporting device, releasing means therefor directly controlled by the actuation of the selecting devices and resetting means free from the control of the selecting devices.

10. The combination of record-actuated contacts, a record-supporting device, a releasing device therefor, and an electromagnet directly connected with the record-actuated contacts for operating the releasing device.

11. The combination of record-actuated contacts, a record-supporting device, a releasing device therefor, an electromagnet directly connected with the record-contacts for operating the releasing device, and resetting means for the supporting device.

12. The combination with record-actuated selecting devices, of a record-supporting device, an armature for locking the supporting device and an electromagnet for actuating said armature to release the supporting device.

13. The combination with record-actuated selecting devices; of a record-supporting device, an armature for locking the supporting device, an electromagnet for actuating the armature to release the supporting device, and resetting means for said supporting device.

14. The combination with record-actuated selecting devices, of a record-supporting device, an independently-movable releasing device therefor adapted to engage therewith, and means such as a spring for moving said supporting device out of the path of the record when released from engagement with its releasing device.

15. The combination with record-actuated selecting devices, of a record-supporting device, an independently-movable releasing device therefor adapted to engage therewith, means such as a spring for moving said supporting device out of the path of the record, and resetting means for said supporting device.

16. The combination of a plurality of record-actuated selecting devices, a record-supporting device, means actuated directly by any one of said selecting devices for releasing said supporting device, and resetting means free from the control of the selecting devices, for said supporting device.

17. In apparatus of the character described, the combination of a record-support, a locking device therefor, means for releasing the locking device from engagement with the support, means for moving the support when such engagement is released, and resetting means.

18. In apparatus of the character described, the combination of a record-support, a locking device for holding it in a fixed position, releasing means, actuating means independent of the locking and releasing means for moving said support, and resetting means.

19. The combination of record-actuated contact devices, record-carrying mechanism, means for effecting a relative reciprocation of the record-carrying mechanism and the contact devices, a record-supporting device, releasing means therefor comprising an electromagnet controlled by the record-actuated contacts, and means free from the control of the record-actuated contacts for resetting said supporting device.

20. In apparatus of the character described, comprising record-controlled devices such as register-indicators or sorting-guides, electromagnets arranged in multiple across the mains of a normally open circuit, means for holding the magnet-circuits normally closed, record-actuated means for opening a predetermined number of the magnet-circuits and means for closing the circuit through the unseparated contact or contacts.

21. The combination with record-controlled devices such as register-indicators or sorting-guides, of electromagnets for controlling the operation of such devices arranged in multiple across the mains of a normally open circuit, contacts for each of said magnet-circuits normally together, record-actuated means for separating a predetermined number of said contacts and means for closing the circuit through the unseparated contact or contacts.

22. The combination of contact devices, normally in contact, a supporting-frame therefor, a record and means for relatively reciprocating the record and the supporting-frame to open said contacts, substantially as set forth.

23. The combination of a supporting-frame, pins carried thereby, contacts carried by the pins, coöperating contacts carried by the frame, and a record for actuating said pins to control said contacts.

24. The combination of a plurality of movable pins, normally closed contacts adapted to be separated by the movement of the pins, a record for controlling the movement of the pins, and means for closing an electric circuit through the unseparated contacts, substantially as set forth.

25. The combination of a plurality of opposed contacts normally together, means controlled by a record for separating said contacts, and means for closing an electric circuit through the unseparated contacts.

26. The combination of a supporting-frame, a plurality of opposed contacts supported thereby and normally together, a record for separating a predetermined number of said contacts, and means for closing an electric circuit through the unseparated contacts.

27. The combination of a plurality of opposed contacts normally together and out of circuit, record-actuated means for separating said contacts and means for closing the circuit through the unseparated contacts.

28. The combination of a stationary frame, record-controlled opposed contact devices, circuit-closing devices, supported in said frame, a reciprocating record-carrying device, centering-fingers for adjusting the card in position in the carrier, and means controlled by the reciprocating mechanism of the card-carrying device to actuate said centering-fingers.

29. The combination of a stationary frame, record-controlled contacts movably supported in said frame, coöperative fixed contacts also mounted in said frame, a reciprocating record-carrying device, and a yielding plate mounted between the frame and the carrier for clamping the record while moving toward the frame.

30. The combination of a stationary frame, yielding pins carried thereby, contacts carried by said pins, coöperating contact-surfaces also carried by said frame, a reciprocating record-carrier and an apertured plate yieldingly mounted between said frame and said carrier for clamping the record while the latter is moving toward the frame.

31. The combination with a record of record-actuated selecting devices supported in a stationary frame, means for reciprocating the records toward the selecting devices and means for supporting the record in vertical alinement with the selecting devices during the reciprocating movement, substantially as set forth.

32. The combination with a record, of record-actuated selecting devices mounted in a stationary support, means for reciprocating the record toward the selecting devices to actuate the latter, means for supporting the record in vertical alinement with the selecting devices during its reciprocating movement, and means for releasing the record from engagement with its supporting means.

33. The combination with a record, of record-actuated selecting devices mounted in a stationary frame, means for reciprocating the record toward the selecting devices to actuate the latter, means for supporting the record in vertical alinement with the selecting devices during its reciprocating movement, centering devices for positioning the record horizontally during its said movement, and means for releasing the engagement of the record and its supporting means.

34. In apparatus of the character described, the combination of record-actuated selecting devices comprising a plurality of opposed contacts normally together, record-supporting devices, record-controlled means for separating a predetermined number of said contacts, means for closing an electric circuit through the unseparated contacts, means controlled directly by the selecting devices for releasing the record-supporting device and means for resetting the same.

HERMAN HOLLERITH.

Witnesses:
C. L. HAYES,
O. E. BRAITMAYER.